(12) United States Patent
Morikawa

(10) Patent No.: US 6,788,830 B1
(45) Date of Patent: Sep. 7, 2004

(54) IMAGE PROCESSING SYSTEM AND IMAGE PROCESSING METHOD

(75) Inventor: Takeshi Morikawa, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 715 days.

(21) Appl. No.: 09/672,434

(22) Filed: Sep. 28, 2000

(30) Foreign Application Priority Data

Sep. 30, 1999 (JP) .......................................... 11-280245

(51) Int. Cl.$^7$ .............................................. G06K 9/54
(52) U.S. Cl. ..................................................... 382/305
(58) Field of Search ................................ 382/305, 312, 382/317, 307; 358/1.14, 1.15, 1.16

(56) References Cited

U.S. PATENT DOCUMENTS

| 5,535,312 A | * | 7/1996 | Hammer et al. ........... 358/1.16 |
| 5,715,329 A | * | 2/1998 | Murata ....................... 382/166 |
| 5,877,864 A | * | 3/1999 | Sumida et al. ............. 358/1.16 |
| 5,901,278 A | * | 5/1999 | Kurihara et al. ........... 358/1.15 |
| 6,023,560 A | | 2/2000 | Yoshida et al. ............ 358/1.16 |
| 6,400,854 B1 | * | 6/2002 | Kudoh ........................ 382/317 |
| 6,636,325 B1 | * | 10/2003 | Kurase ...................... 358/1.14 |

FOREIGN PATENT DOCUMENTS

| JP | 07-221945 A | 8/1995 |
| JP | 07-221948 A | 8/1995 |
| JP | 07-288638 A | 10/1995 |
| JP | 09-149165 A | 6/1997 |
| JP | 09-274605 A | 10/1997 |
| JP | 10-304111 A | 11/1998 |

* cited by examiner

Primary Examiner—Daniel Mariam

(57) ABSTRACT

An image processing system includes an image reader for reading image data of original documents, a memory which is capable of storing image data of the original documents of a plurality of pages read by the image reader and a detector for detecting insufficiency of empty capacity of the memory. A first controller executes a writing of a set of image data of the original documents of a plurality of pages into the memory in a prescribed page order, and repeatedly executes a reading of the set of image data from the memory and an image processing thereof. In the event that insufficiency of empty capacity of the memory is detected by the detector during the writing of image data into the memory by the first controller, a second controller holds the image data of the original documents of one or a plurality of pages stored in the memory and executes a subsequent image processing by using the image data held in the memory. A third controller executes a prescribed processing of a re-reading of image data of the original documents corresponding to the image data not held in the memory among the set of image data by the image reader in the subsequent image processing by the second controller.

17 Claims, 13 Drawing Sheets

(A) | *TOTAL MEMORY AREA FOR ONE JOB* |
    |         R1              |

(B) | *TOTAL MEMORY AREA FOR ONE JOB* |
    | P1 |     R2        |

(C) | *TOTAL MEMORY AREA FOR ONE JOB* |
    | P1 | P2 |    R3      |

(D) | *TOTAL MEMORY AREA FOR ONE JOB* |
    | P1 | P2 | P3 |    R4     |

(E) MEMORY RECALL CONTINUATION MODE
    | *TOTAL MEMORY AREA FOR ONE JOB* |
    | P1 | P2 | P3 | R4, 5, 6 · · · N (F) MEMORY RECALL RELEASED MODE
    | *TOTAL MEMORY AREA FOR ONE JOB* |
    | R4, 5, 6 · · · N

FIG. 9

(A) | * TOTAL MEMORY AREA FOR ONE JOB * |
| * RESERVATION POSSIBLE AREA * | * EMPTY AREA * |
| R1 |

(B) | * TOTAL MEMORY AREA FOR ONE JOB * |
| * RESERVATION POSSIBLE AREA * | * EMPTY AREA * |
| P1 | R2 |

(C) | * TOTAL MEMORY AREA FOR ONE JOB * |
| * RESERVATION POSSIBLE AREA * | * EMPTY AREA * |
| P1 | P2 | R3 |

(D) MEMORY RECALL CONTINUATION MODE
| * TOTAL MEMORY AREA FOR ONE JOB * |
| * RESERVATION POSSIBLE AREA * | * EMPTY AREA * |
| P1 | P2 | P3 | R4、5、6···N |

(E) MEMORY RECALL RELEASED MODE
| * TOTAL MEMORY AREA FOR ONE JOB * |
| * RESERVATION POSSIBLE AREA * | * EMPTY AREA * |
| R4、5、6···N |

FIG.12

IMAGE PROCESSING SYSTEM AND IMAGE PROCESSING METHOD

This application claims priority to Japanese Patent Application No. H11(1999)-280245 filed on Sep. 30, 1999, the disclosure of which is incorporated by reference in its entirety.

BACKGROUND OF THE INVENTION

1. Field of the Invention

The present invention relates to an image processing system such as a print system for use in a copying machine, a printer and the like, and also relates to an image processing method.

2. Description of Related Art

In a copying machine as one of image processing systems, image data read by an image reading apparatus is written into a memory such as a DRAM (Dynamic Random Access Memory) after being stored in a hard disk or without being stored in a hard disk. The written image data is read out from the memory, and then is subjected to an image processing to be printed.

Generally, image data of a plurality of pages is written into a DRAM in a compressed state at a compression rate of from 100% to 5% depending on the original attributes. For example, the compression rate of an image data of a page including many characters, is excellent. On the other hand, the compression rate of image data of a page including a large amount of half tones such as a picture, is poor.

Furthermore, as an image processing mode, an electronic sort mode and a memory recall mode are known. In the electronic sort mode, a processing of reading out image data from a DRAM in a predetermined page order, for example, page 1 to page N→page 1 to page N→ . . . , and printing the image, is repeated a plurality of times. In the memory recall mode, image data of an image once printed is held in a memory such as a DRAM or a hard disk. Thereafter, the image data is read out from the memory again based on, for example, a re-print request of a user, and printed.

As one example of a prior art of an image processing system disclosing a part of the aforementioned structure, Japanese Unexamined Laid-open Patent Publication No. H10-304111 is known. In this prior art, in cases where empty capacity of a DRAM becomes insufficient during a printing of image data or it becomes impossible to secure a predetermined empty capacity, empty capacity of the memory is secured by deleting image data from the page to be printed first among image data of pages 1 to N to be stored in the DRAM from the memory in sequence, i.e., by deleting image data from page 1 from the memory in sequence. Then, in the empty area of the memory, image data of the subsequent page is written to continue the printing operation.

However, in the aforementioned conventional image processing system, in cases where empty capacity of a memory becomes insufficient or it becomes impossible to secure a predetermined empty capacity during the writing of image data when it is repeatedly performed to read and then print one set of image data of page 1 to page N in the page order as in the aforementioned electronic sort mode or memory recall mode, the image data of page 1, which is the first page to be subjected to an image processing, is deleted first. Accordingly, when the image data of page 1 to page N is to be printed again, it is required to newly read all pages of page 1 to page N by an image reading apparatus to store in a DRAM again. This takes a longer time to complete the printing, resulting in a decreased processing efficiency.

This kind of drawback does not always occur only in a copying machine but may also occur in an image processing system to which an image reading apparatus is connected to execute an image processing.

SUMMARY OF THE INVENTION

It is an object of the present invention to provide an image processing system which can avoid a deterioration of an image processing efficiency by avoiding the necessity of re-reading of all of original documents by an image reading apparatus even if empty capacity of a memory becomes insufficient when a writing of image data of a plurality of pages into the memory in a predetermined page order, a reading of the image data from the memory and an image processing thereof are repeatedly performed.

It is another object of the present invention to provide an image processing method which can avoid a deterioration of an image processing speed as a whole even in cases mentioned above.

According to a first aspect of the present invention, an image processing system includes:

an image reader for reading image data of original documents;

a memory which is capable of storing image data of the original documents of a plurality of pages read by the image reader;

a first controller which executes a writing of a set of image data of the original documents of a plurality of pages into the memory in a prescribed page order, and repeatedly executes a reading of the set of image data from the memory and an image processing thereof;

a detector for detecting insufficiency of empty capacity of the memory; and a second controller which, in the event that insufficiency of empty capacity of the memory is detected by the detector during the writing of image data into the memory by the first controller, holds the image data of the original documents of one or a plurality of pages stored in the memory and executes a subsequent image processing by using the image data held in the memory; and a third controller which executes a prescribed processing of a re-reading of image data of the original documents corresponding to the image data not held in the memory among the set of image data by the image reader in the subsequent image processing by the second controller.

According to the second aspect of the present invention, an image processing method which repeatedly reads out a set of image data of a plurality of pages from a memory to execute an image processing thereof, the method includes the steps of:

writing the set of image data of original documents of a plurality of pages read by an image reader into the memory in a prescribed page order in turn and reading out the image data written in the memory in turn to execute an image processing thereof;

detecting insufficiency of empty capacity of the memory during the writing of the image data into the memory;

holding only the image data of the original documents of one or a plurality of pages stored in the memory and executing a subsequent image processing by utilizing the image data held in the memory; and executing a prescribed processing for a re-reading of the original documents corresponding to the original documents whose image data is not held in the memory among the set of image data by the image reader in the subsequent image processing.

With the aforementioned image processing system or the image processing method, in cases where a writing of one set of image data of a plurality of pages read by an image reading apparatus into the memory is performed in a predetermined page order, and a repetition of a reading out of the set of image data from the memory and an image processing thereof is executed, in the same manner as in, for example, the electronic sort mode or memory recall mode, when the empty capacity of the memory becomes insufficient during the writing of the image data into the memory, and a part of image data stored in a memory is held as it is. As for the image data held in the memory, a subsequent image processing is executed by the second controller by utilizing the image data held in the memory. As a result, since it is not required for the part of image data held in the memory to be read by an image reading apparatus even in cases where an image processing is repeated, the processing time as a whole can be shortened.

With regard to the image data not held in a memory, since a prescribed processing of a re-reading thereof by an image reader is performed by the third controller, it is only required to read the image by the image reader in accordance with the prescribed processing, which results in an enhanced operability.

According to the third aspect of the present invention, an image processing system with a memory capable of storing image data of a plurality of pages which executes a writing of a set of image data of a plurality of pages into the memory in a prescribed page order, and repeatedly executes a reading of the set of image data from the memory and an image processing thereof, the image processing system, includes:

an image reader for reading original documents of a plurality of pages to obtain a set of image data to be stored in the memory;

a detector for detecting insufficiency of empty capacity of the memory;

a first processor which, in the event that the insufficiency of empty capacity of the memory is detected by the detector during the writing of the set of image data into the memory, executes an image processing of the image data of one or a plurality of pages previously stored in the memory without deleting the image data from the memory, and executes an image processing of image data of one or a plurality of subsequent pages while executing a writing of the image data into the memory and a deletion thereof from the memory every page; and a second processor which executes an image processing of a second set of image data, wherein the second processor executes an image processing of the image data of one or a plurality of pages stored in the memory by reading out the image data and an image processing of the image data of a subsequent page obtained by reading the original document again; and a third processor for executing a prescribed processing for a re-reading by the second processor.

According this image processing system too, in the event that the memory capacity becomes insufficient, an image processing of the image data of a page previously stored in the memory is executed without deleting the image data and the image processing of the image data of the subsequent page is executed while repeatedly writing the image data into the memory, deleting thereof from the memory and executing an image processing thereof. Therefore, the whole processing time can be shortened. Furthermore, since the prescribed processing for a re-reading of the image not stored in the memory is executed, it is only required to read the image by an image reader in accordance with the prescribed processing, resulting in an enhanced operability.

Other objects and the features of the invention will be apparent from the following detailed description of the invention with reference to the attached drawings.

BRIEF DESCRIPTION OF DRAWINGS

The present invention will be more fully described and better understood from the following description, taken with the appended drawings, in which:

FIG. 9 is an explanatory view for explaining the operation together with the contents of the memory when the memory becomes full;

FIG. 12 is an explanatory view for explaining the operation together with the contents of the memory when the memory becomes nearly full.

DETAILED DESCRIPTION OF THE PREFERRED EMBODIMENTS

Figure 1:
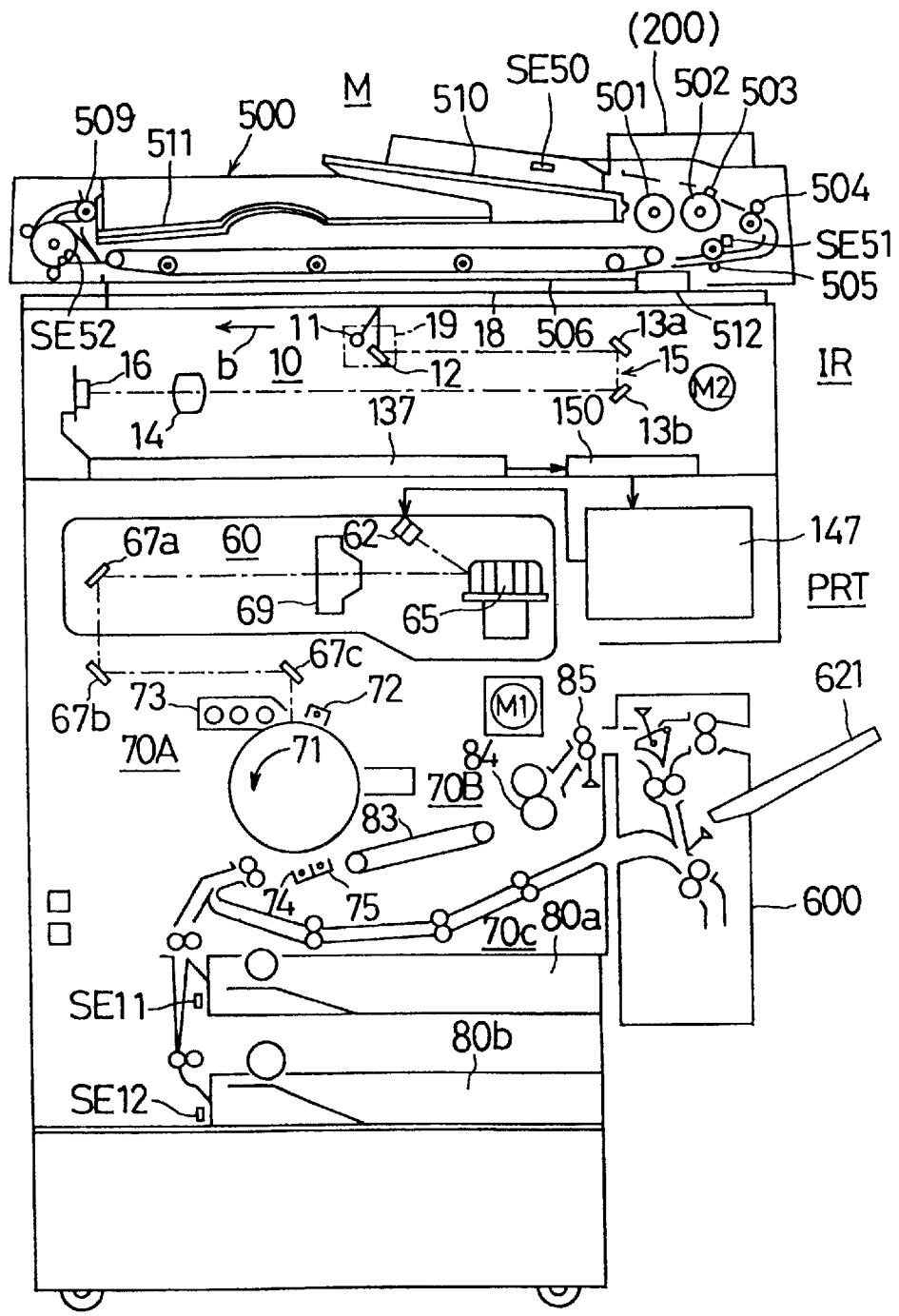
FIG. 1 is a schematic structural view of a copying machine to which an image processing system according to an embodiment of the present invention is applied.

FIG. 1 is a front vertical cross-sectional view showing a schematic structure of a copying machine M equipped with a print system which is an image processing system according to one embodiment of the presents invention. As shown in FIG. 1, the copying machine M is a digital copying machine equipped with an image reader IR as an image reading apparatus and a page printer PRT.

In the following description, the state that it becomes impossible for a memory to store image data due to insufficiency of memory capacity, is called "memory full," and the state that it becomes impossible for a memory to store image data under the condition that an empty area of a predetermined capacity remains in the memory, is called "memory near full."

The image reader IR includes a scanner 10, an input signal processor 137 and an image memory 150, and reads an original document placed on an original document placing glass plate 18 to generate image data corresponding to each pixel of the original image. A first scanner 19 equipped with an exposure lamp 11 and a first mirror 12 and a second scanner 15 equipped with a second mirror 13a and a third mirror 13b are driven by a scan motor M2 in the direction of an arrow b (the sub-scanning direction). The light of the exposure lamp 11 is reflected by the original document placed on the original document placing glass plate 18 to be irradiated into a line sensor 16 via the mirrors 12, 13a and 13b and a lens 14. The line sensor 16 is comprised of a number of photoelectric converting elements (CCD) arranged in the direction perpendicular to the paper of FIG. 1 (in the main scanning direction) to output image data corresponding to each pixel. Since the first scanner 19 and the second scanner 15 moves in the direction b as mentioned, the line sensor 16 can sub-scan the original image. In the meantime, it is detected by a sensor (not shown) whether or not the first scanner 19 is positioned at its home position.

On the body of the image reader IR, an automatic both-sided document feeder (ADFR) 500, which also functions as an original document cover, is connected such that it can open and close about the rear end as a fulcrum. The ADFR 500 transfers the original documents set on an original document stacker 510 onto the original document placing glass plate 18 by paper-feeding rollers 501, guide rollers 502, guide pads 503, intermediate rollers 504, resist rollers 505 and a transferring belt 506, and discharges the scanned original document onto the original document discharge tray 511 by paper-discharging rollers 509. Furthermore, provided to the ADFR 500 are an original document scale 512, an original document sensor SE50 which detects whether there is an original document, an original document size sensor SE51 and a discharge sensor SE52. The reference numeral 200 in FIG. 1 denotes an operation panel.

The page printer PRT includes a printing processor 147 which outputs an exposure control signal, a print head 60 with a semiconductor laser 62 as a light source, a development/transfer system 70A including a photosensitive drum 71 and its peripherals, a fixing/discharging system 70B including a fixing roller 84 and a discharging roller 85 and a circulation type paper discharge system 70C including a paper re-supplying unit 600. The page printer PRT prints a reproduced image through an electrophotography process based on the image data transferred from the image reader IR. Provided at the lower portion of the page printer PTR are two paper cassettes 80a and 80b in which several hundreds of papers can be stored, two paper size sensors SE11 and SE12 and paper feeding rollers.

The laser beam output from the semiconductor laser 62 changes its traveling direction toward the main scanning direction by a polygon mirror 65. Thereafter, the laser beam is led to an exposure position on the photosensitive drum 71 via a main lens 69 and various mirrors 67a, 67band 67c. The surface of the photosensitive drum 71 is uniformly charged with electricity by an electrification charger 72. The latent image formed by an exposure changes into a toner image by a developer 73, and is transcribed onto a paper at a transcribing position by a transcribing charger 74. Then, the paper is detached from the photosensitive drum 71 by a detaching charger 75, and is discharged to a discharging tray 621 with its face up via a transferring belt 83, the fixing rollers 84 and the discharging rollers 85.

Figure 2:
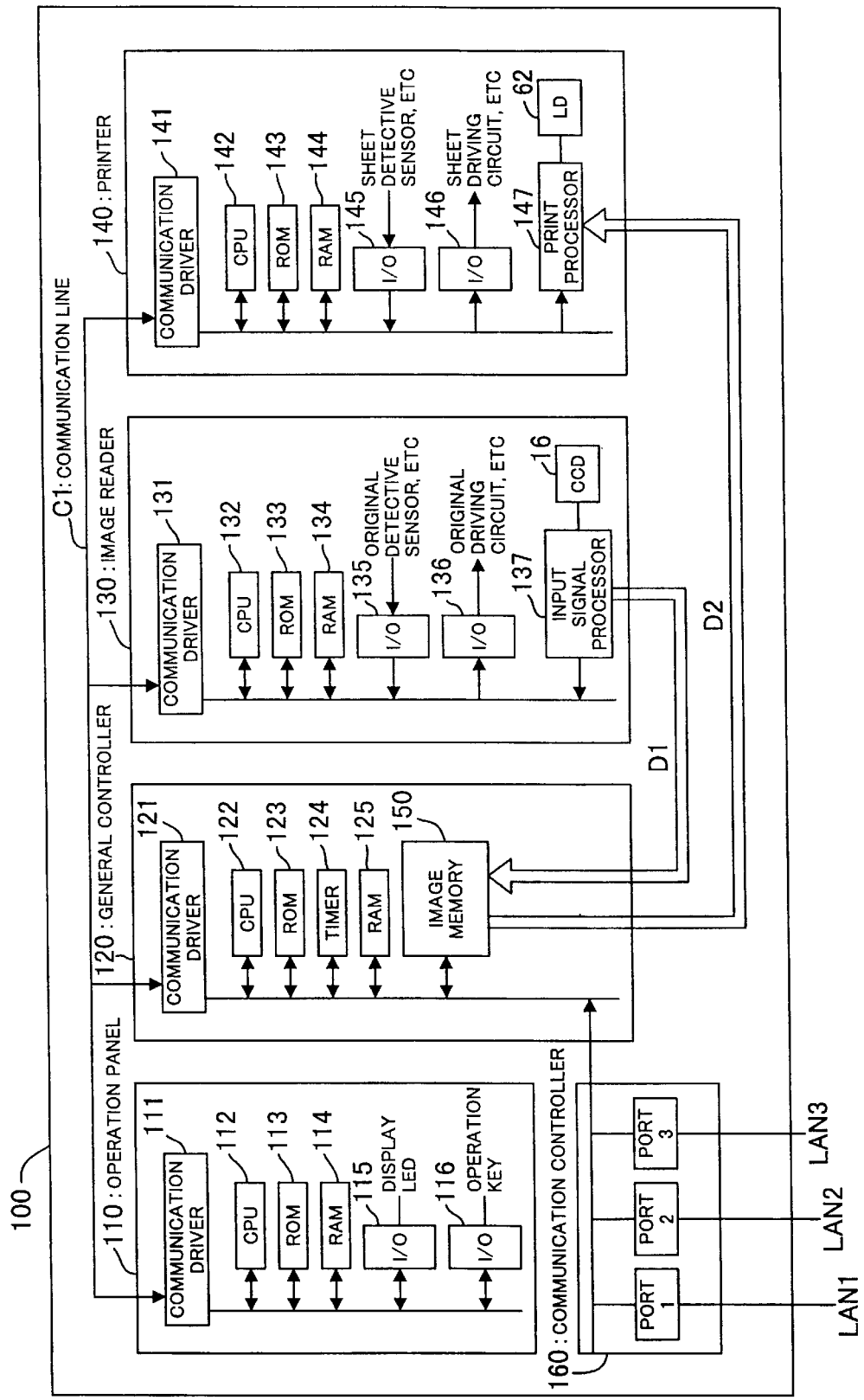
FIG. 2 is a block diagram of the control unit of the copying machine shown in FIG. 1.

FIG. 2 is a block diagram showing a structure of a control unit for controlling the copying machine M. As shown in FIG. 2, the control unit 100 includes an operation panel controller 110, a general controller 120, an image reader controller 130 (image reader IR) and a printer controller 140. The operation panel controller 110 includes a communication driver 111, a CPU 112, a ROM 113, a RAM 114, two I/O (input/output portions) 115 and 116. The general controller 120 includes a communication driver 121, a CPU 122, a ROM 123, a timer 124, a RAM 125 and image memory 150. The image reader controller 130 includes a communication driver 131, a CPU 132, a ROM 133, a RAM 134, two I/O 135 and 136, an input signal processor 137 and a CCD 16. The print controller 140 includes a communication driver 141, a CPU 142, a ROM 143, a RAM 144, two I/O 145 and 146, a print processor 147 and a semiconductor laser (LD) 62. These blocks 110, 120, 130 and 140 are connected with each other via the communication drivers 111, 121, 131 and 141 and a communication cable C1 (communication line) to exchange commands and/or status by serial communications.

The copying machine M is connected to three LANs (LAN 1 to LAN 3) via a communication controller 160 so as to form (i.e., print) an image in accordance with the image data transmitted from each personal computer on the LANs 1 to 3.

The operation panel controller 110 is a block for controlling the operation panel. The controller reads the information input through various operation keys or a touch panel, and displays the set information and/or the operation status of the copying machine on the light-emitting diode (LED) or the liquid crystal display 206 shown in FIG. 4. The information input by a user through key operations or touch panel operations is transmitted as a copy mode to the general controller 120 via the communication cable C1.

The image reader controller 130 controls the scanner 10 and the ADFR 500. The controller detects whether there is an original document on the ADFR 500 and/or the transferring status of the original document via the I/O 135, and controls an original document driving circuit and a mirror driving circuit for scanning an original document via the I/O 136. Furthermore, after the image data of the original document read by the CCD 16 is processed at the input signal processor 137, the processed image data is transmitted to the general controller 120 and stored in the image memory 150.

The printer controller 140 controls the aforementioned page printer PRT and the discharging system option. The controller executes various processing including a paper feeding, a developing, a transferring and a fixing to form an image on a predetermined paper.

The general controller 120 controls the whole apparatus, and also manages the image data written by the image reader IR. In the aforementioned image memory 150 of the general controller 120, image data of a number of pages written by the image reader IR can be stored. The image data transmitted from the image reader IR is stored in the image memory 150 via the image bus D1. At the time of printing, the image data is transmitted to the printer controller 140 via the image bus D2. Then, an image print is formed. The image memory 150 will be detailed later.

Since the image data read by the image reader IR can be stored in the image memory 150, by repeatedly transferring the image data to the printer controller 140 from the RAM, it is possible to make a plurality of copies by scanning the original document once. Furthermore, it is also possible to execute an electronic sort processing in which a processing of reading an image data in a predetermined page order, for example, page 1 to page N→page 1 to page N →..., to print the image, is repeated a plurality of times. It is also possible to execute a memory recall processing in which image data once printed is held, and then, the image data is read again to be printed. The process of the copying operation has been stored in a table in the RAM 125 of the general controller 120. When the image data read is printed actually, the CPU 122 controls the process of the copying operation by referring the table stored in the RAM 125. In other words, the CPU 122 functions as the controllers for executing the electronic sort mode or the memory recall mode. The table will be detailed later.

Although the general controller 120 controls the whole copying operations by sending commands to the operation panel controller 110, the image reader controller 130 and the printer controller 140, since such a controlling method is similar to the controlling method employed in a conventional digital copying machine, the explanation will be omitted.

Figure 3:
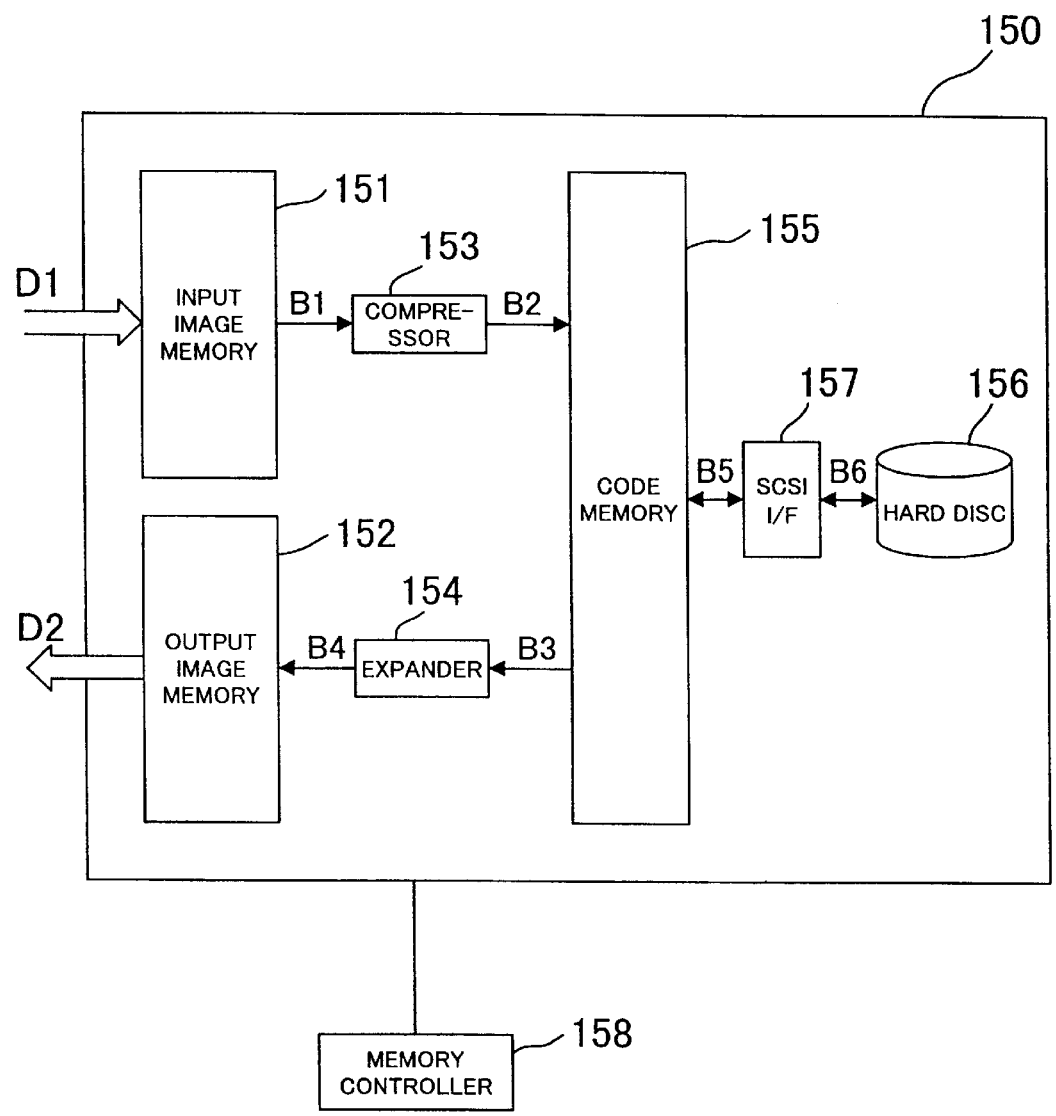
FIG. 3 is a block diagram of an image memory in the general controller of the control unit shown in FIG. 2.

FIG. 3 is a control block diagram showing the operation of the image memory 150 of the copying machine M. The image data read by the image reader IR is transferred to the input image memory 151 via the image bus D1. Since the image data is large in capacity, the image data is sent to the compressor 153 via the image bus B1 to be compressed. The compressed image data is transferred to the code memory 155 via the image bus B2. The code memory 155 is comprised of a DRAM in which a plurality of image data can be stored. The stored image data can be utilized in a state that the order is changed. When printing the image data, the image data selected in the code memory 155 is transmitted to the expander 154 via the image bus B3 to be expanded. Thereafter, the expanded image data is transferred to the output image memory 152 via the image bus B4. The image data in the output image memory 152 is output via the image bus D2 in synchronism with the page printer PRT.

The code memory 155 can store image data of a plurality of original documents. However, in cases where it is required to store a large amount of image data, the code memory 155 cannot store all of the image data. Thus, when it becomes impossible to store image data in the code memory 155, the image data is transferred to the hard disk 156 by the SCSI I/F 157 via the image buses B5 and B6. When printing the image data stored in the hard disk 156, the image data in the hard disk 156 is transferred to the code memory 155 once by the SCSI I/F 157 via the image buses B5 and B6. Thereafter, the image data is printed. The transfer of image data within the image memory 150 shown in FIG. 3 is performed by a memory controller 158. Since the SCSI I/F 157 belongs to a general technique, the explanation will be omitted.

Figure 4:
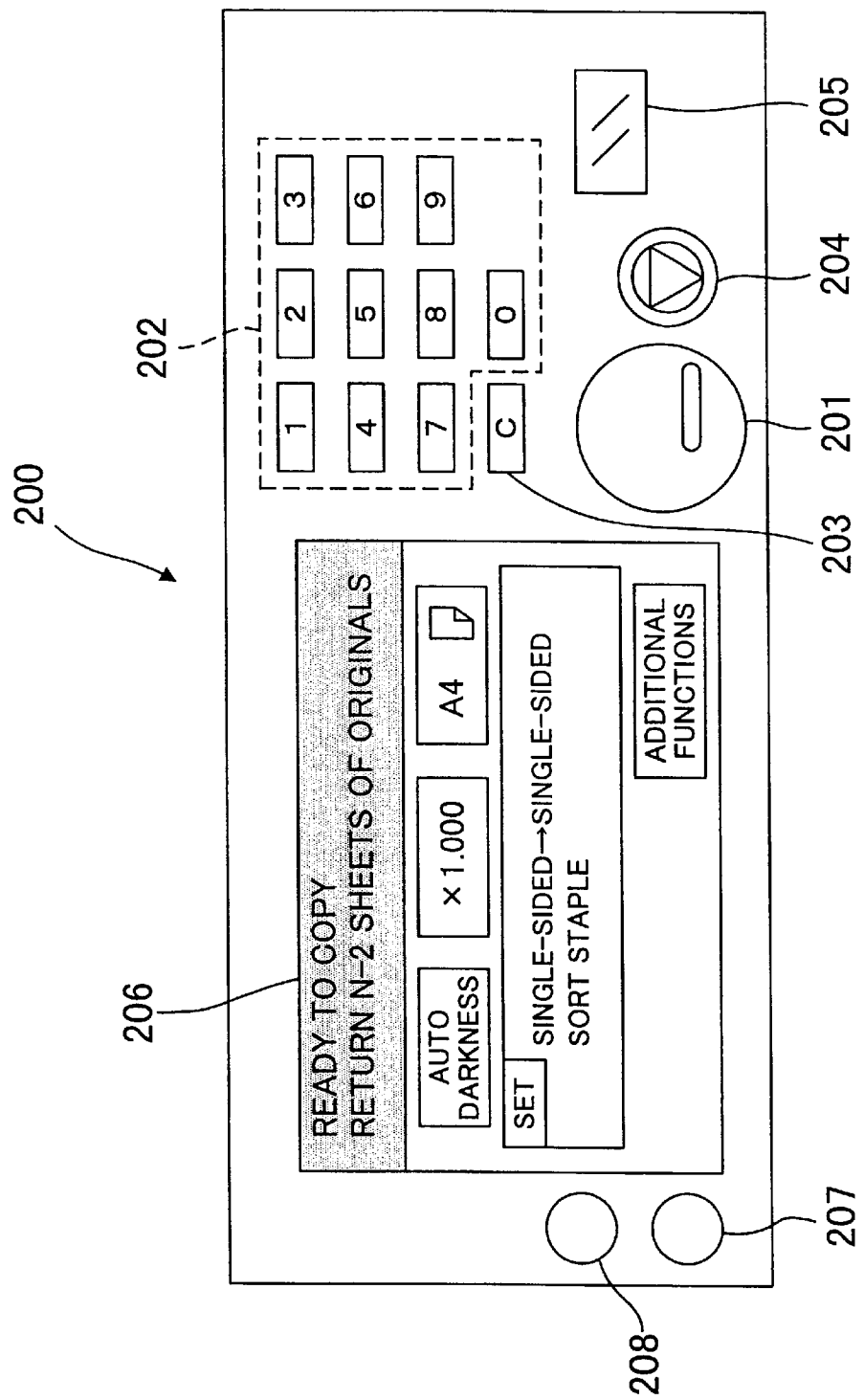
FIG. 4 is a plan view of an operation panel of the copying machine shown in FIG. 1.

FIG. 4 is a plan view showing the structure of the operation panel 200 of the copying machine M. The print start key 201 is used to start a copying operation, and the ten key 202 is used to input a numeral such as the number to be copied. The clear key 203 is used to clear the input numerals or discard the image data in the image memory 150. The stop key 204 is used to stop the copy operation or both the copy operation and the read operation. The panel reset key 205 is used to discard the set image mode and job.

Furthermore, the operation panel 200 is equipped with a liquid crystal display 206 having a touch panel thereon. By this touch panel, various settings corresponding to the displayed contents in the liquid crystal display 206 can be set up. For example, a magnification and other image mode can be set up.

The crystal liquid display 206 displays various information. For example, in the electronic sort processing or the memory recall processing, when the memory of the code memory 155 becomes full or near full during the writing of the image data into the code memory 155, the crystal liquid display indicates that the total number of original documents whose image data is discarded from the code memory 155, or whose image data is not stored in the code memory 155, should be returned to the ADFR 500 for scanning them again by the image reader IR.

The operation panel 200 is further provided with a recall memory key 207 for the memory recall processing and a release key 208. The release key 208 is used to release the electronic sort processing or the memory recall processing when the code memory 155 becomes full or near full during the writing of the image data into the code memory 155. The electronic sort processing can be performed automatically by setting a plural copying numbers for a plurality of original documents.

Figure 5:
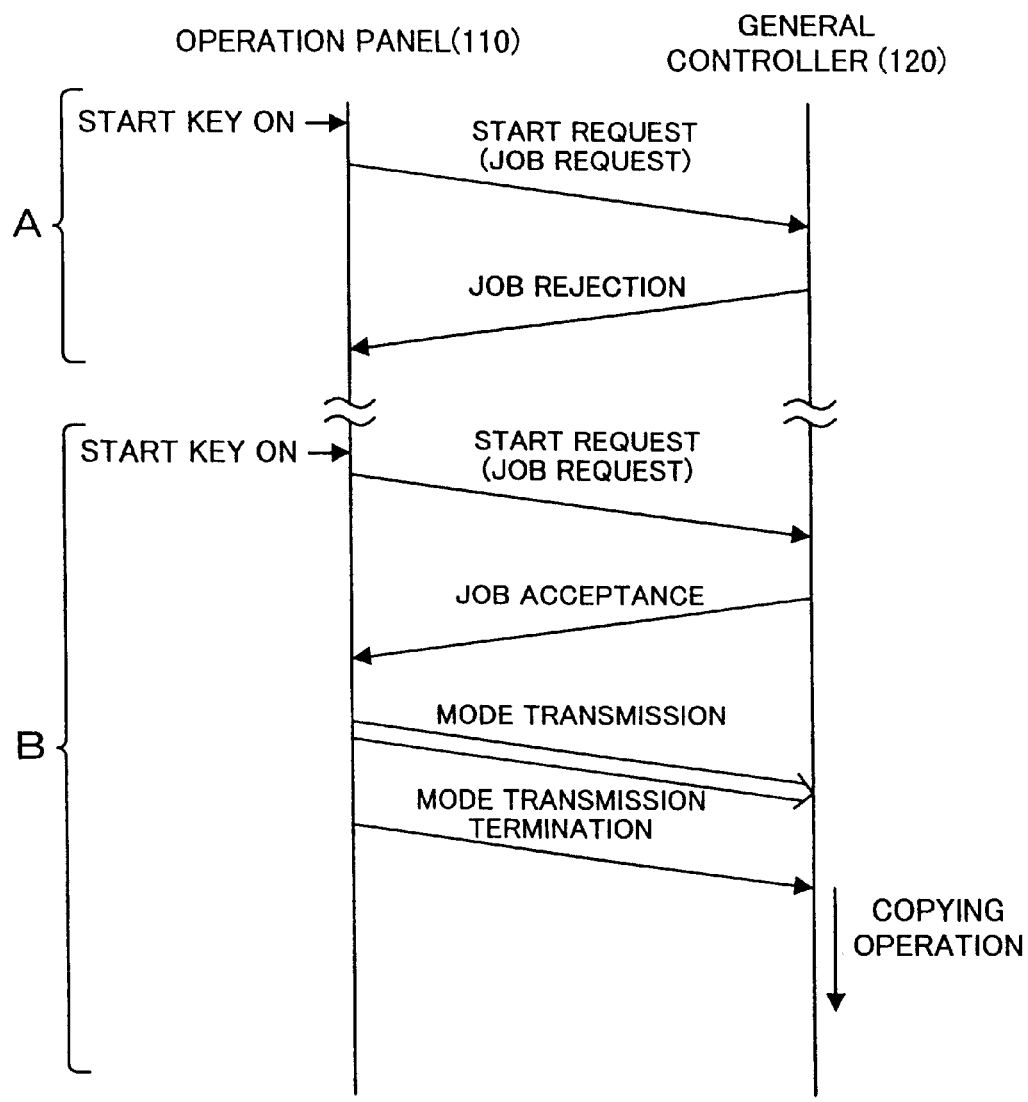
FIG. 5 shows a sequence in which the copying machine shown in FIG. 1 accepts a print operation of an image read by a image reader.

FIG. 5 shows a sequence in which the copying machine M accepts a print operation of an image read by the image reader IR.

When the start key 201 of the operation panel 200 is depressed, the operation panel controller 110 issues a start request (job request) to the general controller 120. The general controller, 120 checks whether or not the below mentioned job acceptance conditions are satisfied, and returns the check result to the operation panel controller 110. In FIG. 5, "A" shows the case where the conditions are not satisfied, and "B" shows the case where the conditions are satisfied. As shown in A, if the conditions are not satisfied, the general controller 120 returns"job rejection" to the operation panel controller 110. If the conditions are satisfied, the general controller 120 returns "job acceptance" to the operation panel controller 110.

When the operation panel controller 110 receives "job rejection," the controller transmits the operation mode information (information showing the operation conditions) for printing the image read by the image reader IR to the general controller 120, and transmits a transmission termination signal when the transmission of the operation mode information is terminated. When the general controller 120 receives the transmission termination signal, it starts the printing operation of the image read by the image read IR.

In the meantime, in the case where the transmitted mode is not the mode for immediately printing the image read by the image reader IR but the mode for printing the image after the image forming of the image data stored in the image memory 150 has been performed to some degree, after receiving the mode termination signal, the general controller 120 starts to store the image data read by the image reader IR into the image memory 150, and then prints the image at an appropriate timing (included in the aforementioned mode).

Figure 6:
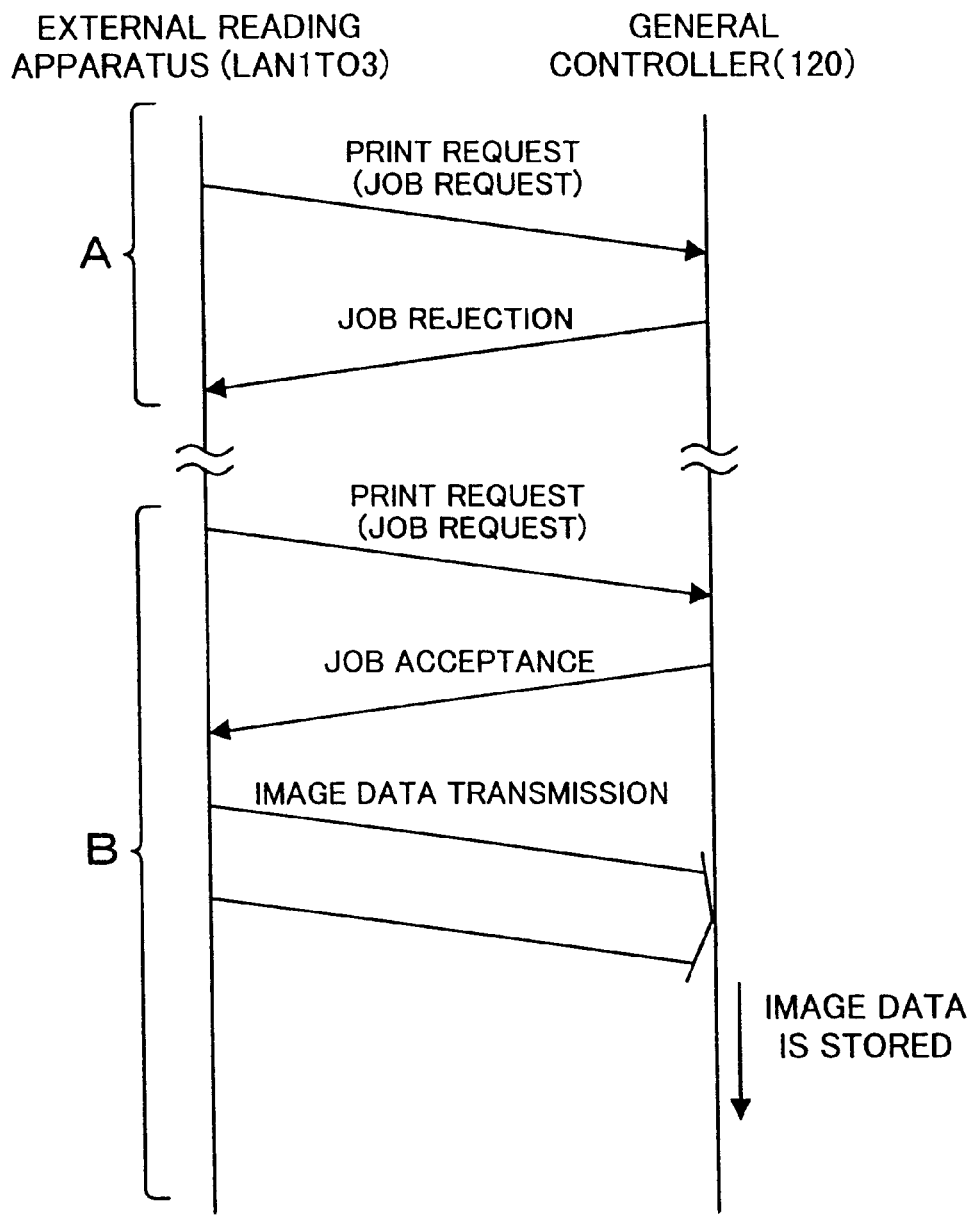
FIG. 6 shows a sequence in which the copying machine shown in FIG. 1 accepts a print operation from s personal computer (PC) on the LAN 1-LAN 3 shown in FIG. 2.

FIG. 6 shows a sequence in which the copying machine M accepts the print operation in accordance with the image data transmitted from the external image reading apparatuses on the LAN 1 to LAN 3.

When the general controller 120 receives a print request (job request) from the external image reading apparatus, it judges whether or not it is possible to accept the job, and returns the result to the external image reading apparatus (in this case, a hand shaking is performed via the LANs). In FIG. 6, "A" shows the case where acceptance conditions are not satisfied. In this case, the general controller 120 returns "job rejection" to the external image reading apparatus. On the other hand, "B" shows the case where acceptance conditions are satisfied. In this case, the general controller 120 returns "job acceptance" to the external image reading apparatus.

As shown in B, when the external image reading apparatus receives "job acceptance," the apparatus transmits image data to the general controller 120. In accordance with this, the general controller 120 stores the image data into the code memory 155 of the image memory 150.

Figure 7:
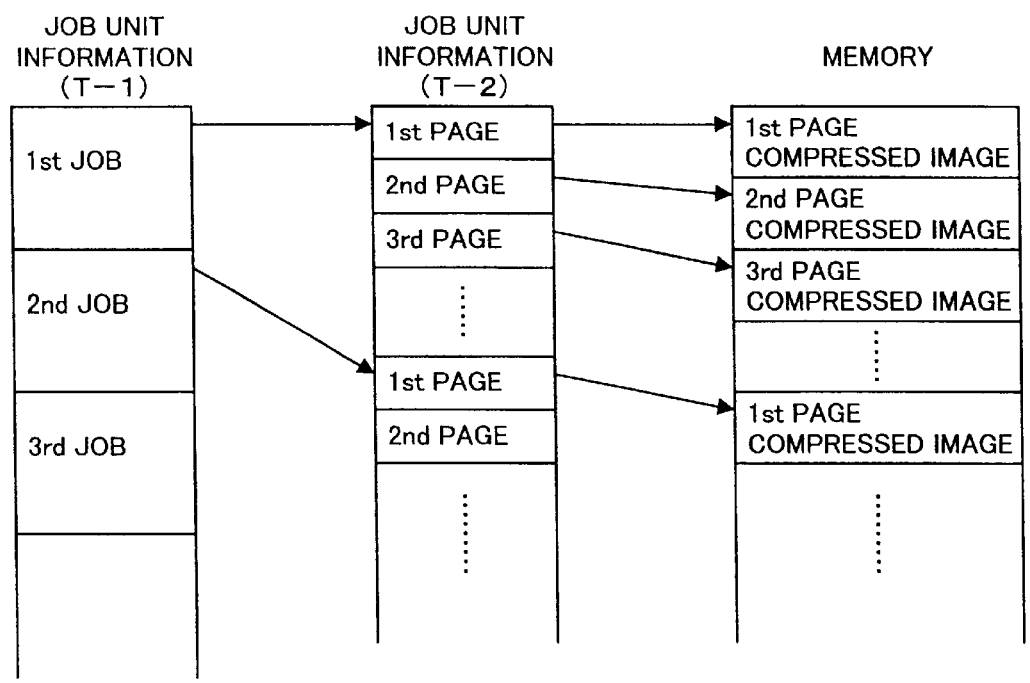
FIG. 7 is an explanatory view showing a schematic structure of a management table in a RAM which is referred to by the copying machine shown in FIG. 1 when the read image data is actually printed.

FIG. 7 is an explanatory view showing a schematic construction of the management table in the RAM 125 which is referred to by the copying machine M when the copying machine M actually prints the image data read or the image data transmitted from the PC.

Since it is necessary to manage the information on the image of the original image every job unit, a plurality of pages are stored in a divided manner in each job unit. Accordingly, the table includes a table (job unit information T-1) for storing the job unit information and a table (job unit information T-2) for storing the divided page unit information. The job includes a job which is read by the image reader IR of the digital copying machine 1 and a job which is input from an external apparatus such as a computer. The print data of the job transmitted from the outside is managed by the management table as one job in the same way as the image data read.

Stored in the job unit information T-1 are the job ID, the registration status of the job, the information concerning the page unit information address, the specified number of pages or sets and the type of economy copy. In the job unit information T-2, the information concerning the address of the compressed image data is stored.

The memory controller 158 reads the image data from the input image memory 151, and compresses the image data. At this time, the memory controller 158 stores the compressed image data into the code memory 155 by controlling the compressor 153 while forming information of the management table. Furthermore, when outputting the image data, the memory controller 158 reads out the compressed image data from the code memory 155 contrary to the data storing. The information in the management table is deleted at the time of completion of the normal reading of the corresponding page information and the completion of the printing of the number of sheets or sets specified by the operator.

Figure 8:
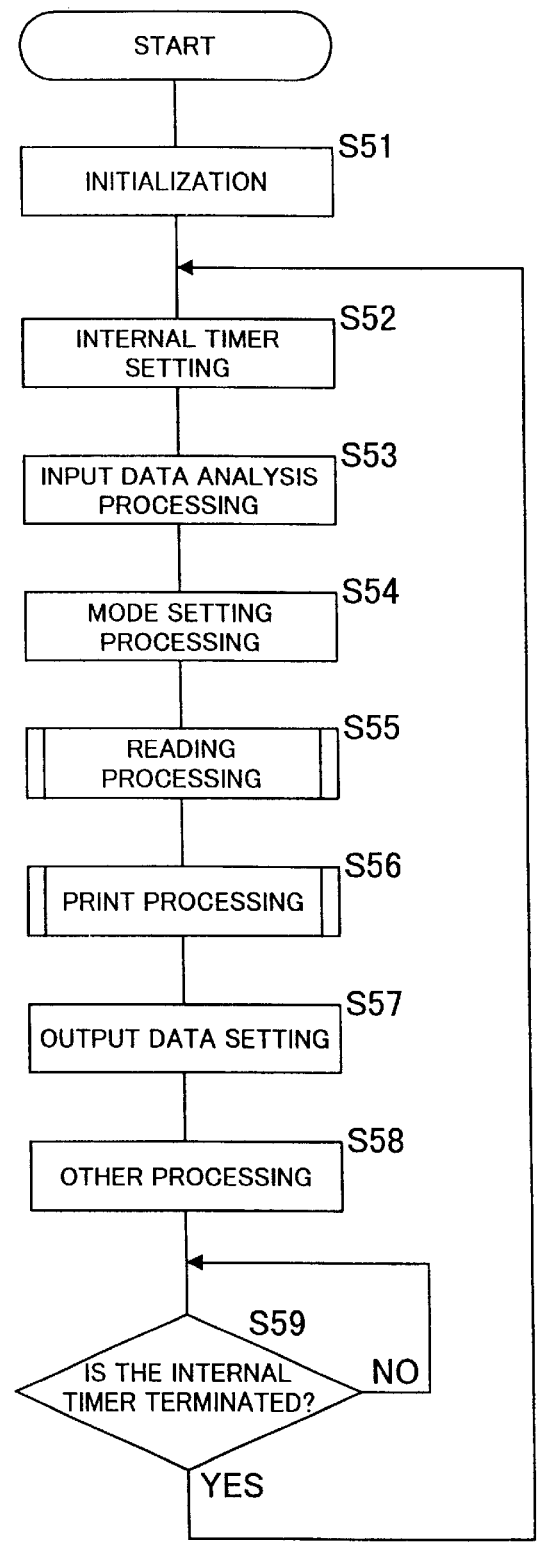
FIG. 8 is a flowchart showing a main routine of a CPU of the general controller which controls the copying machine shown in FIG. 1.

FIG. 8 is a flowchart showing a main routine of the CPU 122 of the general controller 120 which controls the copying machine M.

After the initialization (S51), the CPU 122 repeats the internal timer setting (S52), the input data analysis processing for checking the data input from another CPU (S53), the mode setting processing for setting the operation mode corresponding to the operation contents (S54), the reading processing (S55), the print processing (S56), the output data setting for holding the command at the communication port (S57), other processing (S58) and the waiting of the termination of the internal timer (S59). The peculiar processing of this embodiment resides in the reading processing (S55) which will be detailed later.

Next, the processing applied to the case where the capacity of the code memory 155 becomes full in the middle of a writing of the image data into the code memory 155 in the memory recall mode, will be explained with reference to FIG. 9.

In this embodiment, it is judged that the memory becomes full when image data exceeds the total capacity (for example, 16 M bits) of the code memory 155. The judgement is performed by the memory controller 158. In other words, the memory controller 158 functions as a memory full detector. Concretely, the detection is performed based on the data amount, assuming that the image data (the size is equal to the original document size) of the original document is compressed by the compressor 153 at the predetermined compression rate. In this embodiment, taking account of safety, the worst compression rate is employed as the predetermined compression rate. The worst compression rate for a photographic original document or an all half tone original document is 1.0. However, it is not limited to the worst compression rate but may be an average compression rate or a compression rate slightly lower than an average compression rate.

As shown in FIG. 9(A), in the code memory 155, the size of the total memory area for one job is shown as |*total memory area for one job*|. When the memory area for stdring the compressed image data is shown as |R1| assuming that the image data on page 1 of the original document is compressed at the compression rate 1.0, the memory controller 158 compares the |*total memory area for one job*| of the code memory 155 with the image data |R1| of page 1. If the |*total memory area for one job*| is larger than the |R1| (|*total memory area for one job*|>|R1|), the memory controller 158 reserves R1. Then, as shown in FIG. 9(B), the image data of page 1 is compressed by the compressor 153 into the data P1. The data P1 is written in the code memory 155.

Next, assuming that the image data on page 2 of the original document is compressed at the compression rate 1.0, it is judged whether or not it is possible to reserve R2 by comparing the compressed image data |R2| with the remained area of the |*total memory area for one job*| of the code memory 155. If it is possible to reserve, the image data R2 on page 2 is compressed into data P2, and the compressed data P2 is written into the code memory 155, as shown in FIG. 9(C).

Similarly, as shown in FIGS. 9(C) and 9(D), if it is possible to reserve the image data R3 on page 3, the image data R3 is compressed into data P3. Then, the compressed data P3 is written into the code memory 155.

The memory reserved data P1, P2 and P3 are read out in order and expanded by the expander 154 to be printed (image processed) by the printer PRT.

Next, as shown in FIG. 9(D), assuming that the image data on page 4 of the original document is compressed at the compression rate 1.0, it is judged whether or not it is possible to reserve R4 by comparing the compressed image data |R4| with the remained area of the |*total memory area for one job*| of the code memory 155. If it is judged that it becomes impossible to reserve R4, or the memory becomes full, because of the decreased empty area of |*total memory area for one job*|, it is possible to select a release of the memory recall mode. If the continuation is selected, as shown in FIG. 9(E), the compressed image data P3 on page 3, just before the page, is forcibly discarded after the completion of printing thereof. Then, the image data P4 which is formed by compressing the image data R4 is written into the code memory 155. If it is impossible to reserve the image data P4 even if the compressed image data P3 is discarded, the compressed image data P2 may be discarded in addition to the compressed image data P3. As for page 5, the compressed image data P4 on page 4 is discarded after the completion of printing thereof, the compressed image data P5 on page 5 is written. Thus, while discarding the compressed image data P(n-1) on the previous page, the compressed image data Pn on the next page is written, read and printed. Thus, prints of page 1 to page N can be obtained.

As it is apparent from the above, in the code memory 155, the compressed image data P1 and P2 on pages 1 and 2 are stored without being discarded. Therefore, in the case of printing original documents of N pages, from the next printing of the set of original documents, it is only required to read the original documents of a total (N−2) pages from page 3 to page N whose image data are discarded (i.e., the number of original documents to be returned is N−2) by the image reader IR. Since the re-reading of the original documents can be performed during the printing operation of the image data of page 1 and page 2 stored in the code memory 155 and a reading of the image data of page 1 and page 2 is not required , the whole processing time can be shortened. The number N−2of the original documents to be returned, is displayed on the crystal display 206 of the operation panel 200 such that "RETURN N−2SHEETS OF ORIGINALS" as shown in FIG. 4 based on an instruction of the CPU 122 of the general controller 120.

In the above explanation, in cases where the continuation of the memory recall mode is released by the operation of the release key 208 when it becomes impossible to reserve the image data R4 on page 4, as shown in FIG. 9(F), the stored compressed image data P1 to P3 of pages 1 to 3 are forcibly discarded from the code memory 155 after printing them. In this state, the compressed image data of each page subsequent to page 4 is written, printed and then discarded repeatedly in the same way as mentioned above, to obtain prints of pages 1 to N.

Figure 10:
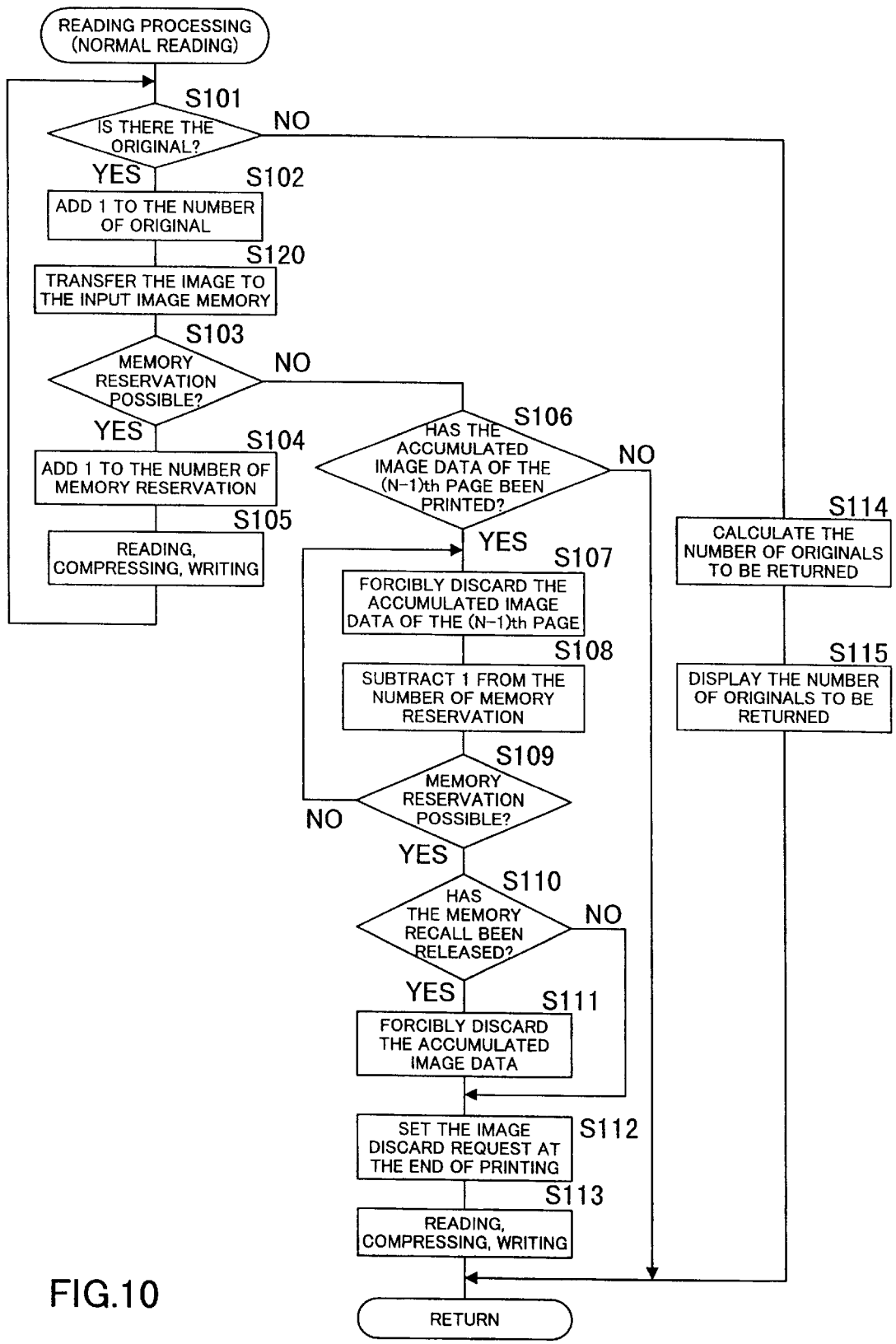
FIG. 10 is a flowchart showing a subroutine of the reading processing in the flowchart shown in FIG. 8 which shows the operation when the memory becomes full.

FIG. 10 is a flowchart showing the operation when the memory becomes full in the memory recall mode shown in FIG. 9, and is a subroutine showing the contents of the reading processing 555 in the main routine shown in FIG. 8. In the following explanation and drawings, a language "Step" will be abbreviated as "S".

In S101, it is checked whether or not there is the original document (page n). If there is the original document (YES in S101), in order to calculate the number of pages of the original documents to be returned when the memory becomes full, in S102, 1 is added to the number of original documents to grasp the total number n of original documents at this time.

In S120, the image data is transferred to the input image memory 151. Thereafter, in S103, it is judged whether or not it is possible to reserve (store) a data corresponding to the image data Rn of the page compressed at the compression rate 1.0 in the code memory. If it is possible to reserve (YES in S103), in S104, 1 is added to the number of memory reservation. Thereafter, in S105, the image data Rn is read, compressed by the compressor 153 and written in the code memory 155. Then, the routine returns to S101 to check whether or not there is the original document of page (n+1).

As a result of the judgement in S103, if it is impossible to reserve (memory full) the data (NO in S103), in S106, it is checked whether or not the compressed image data Pn−1 of the (n−1)$^{th}$ page, one page before, has been printed. If not printed yet (NO in S106), this routine returns since the compressed image data Pn−1 cannot be discarded. If printed (YES in S106), in S107, the image data is forcibly discarded. Thereafter, in S108, 1 is subtracted from the number of memory reservation of the original documents. In S109, it is judged whether or not it is possible to reserve again. If it is not possible to reserve (NO in S109), the routine returns to S107 to delete the compressed image data Pn−2 of the (n−2)$^{th}$ page, one page before. In S108, 1 is further subtracted from the number of memory reservation, and the steps of from S107 to S109 are repeated until the memory reservation becomes possible.

When the memory reservation becomes possible (YES in S109), in S110, it is judged whether or not the memory recall mode has been released. If released (YES in S109), since the accumulated image data P1 to Pn−2 has been printed, in S111, these data are forcibly discarded. Thereafter, the routine proceeds to S112. On the other hand, if the memory recall mode is continued (NO in S110), the routine proceeds to S112 without executing the processing in S111.

Since it becomes possible to store the image data Pn in the empty area generated by discarding the image data of one page before or one to several pages before executed in S107, in S112, an image discard request for discarding the image data Pn at the end of printing is set.

The releasing or non-releasing of the memory recall mode may be set before the job by a user, or may be set at the time when the memory becomes full. Furthermore, when the memory recall mode is released, the fact that the memory recall mode is released may be displayed on the liquid crystal display 206 at the end of printing.

After the setting of the discard request in S112, the routine proceeds to S113. In S113, the image data Rn is read, compressed by the compressor 153 and then written in the code memory 155. Then, the routine returns.

In S101, if there is no original documents (NO in S101), the routine proceeds to S114 to calculate the number of original documents to be returned from the difference between the number of original documents in S102 and the number of memory reservations in S104 or S108. The calculated number of original documents to be returned is displayed on the liquid crystal display 206 in S115. Then, the routine returns.

Figure 11:
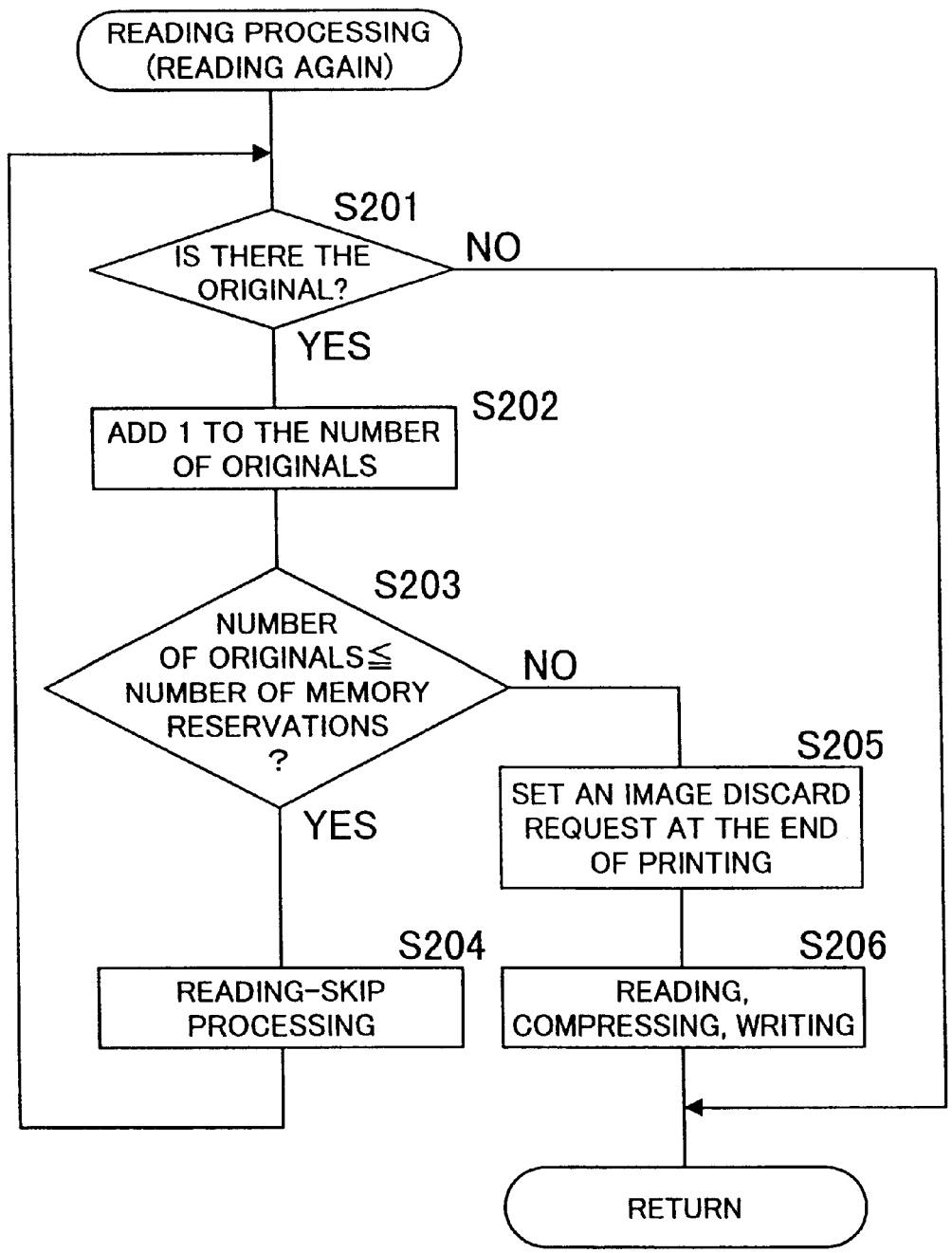
FIG. 11 is a flowchart showing another subroutine of the reading processing in the flowchart shown in FIG. 8.

FIG. 11 is a flowchart showing the case where a re-reading of the original documents are performed by the image reader IR in order to print one or plural sets of the original documents of pages 1 to N after the memory becomes full.

In S201, it is judged whether or not there is the original document. If there is the original document (YES in S201). In S202, 1 is added to the number of original documents to grasp the page number of the original document.

In S203, the number of original documents and the present number of memory reservations calculated in S108 in FIG. 10 are compared. If the number of original documents is smaller than or equal to the present number of memory reservations (YES in S203), since the image data of these pages is accumulated in the code memory 155 and therefore is not required to be read again, in S204, a reading-skip processing is executed. Then, the routine returns to S201.

On the other hand, if the number of original documents is larger than the present number of memory reservations (NO in S203), since the image data of this page is not accumulated, in S205, an image discard request at the end of printing is set. Then, the routine proceeds to S206 to read, compress and write the image data. Then, the routine returns.

Then, in the following print processing in S56 shown in FIG. 8, the memory reserved original documents (page 1 and page 2) are read out from the code memory 155 in turn to be subjected to the print processing by the printer PRT. On the other hand, the non-memory reserved original documents (page 3 to page N) are subjected to a print processing by repeating the reading, the compressing, the writing, the reading out, the printing and the discarding. This operation will be repeated if additional plural sets of printed documents are required.

In the processing shown in FIG. 11, all of the original documents including the memory reserved pages 1 and 2 are set to the image reader IR, and the memory reserved pages are subjected to the reading-skip processing. However, based on the return number of original documents displayed on the operational panel 200, a user may set only the non-memory reserved original documents to the image reader IR to read the image. In this case, it is not required to execute the processing in S202 to S204 and it is only required to execute the processing in S205 and S206 after the processing in S201.

Next, the processing applied to the case where the capacity of the memory becomes near full in the middle of a usage of the copying machine M shown in FIG. 1 in the memory recall mode, will be explained with reference to FIG. 12.

In this embodiment, it is judged that the memory becomes near full when the state of the code memory 155 becomes such that a certain amount of empty capacity such as 8 M bits among the full capacity (for example, 16 M bits) cannot be retained. The aforementioned 8 M bits corresponds to the data amount of A3 size document such as all half tone photographic original document compressed at the worst compression rate 1.0 Since it is practically enough to keep the empty capacity corresponding to the aforementioned data amount, the amount is set to the aforementioned empty capacity. If there are only a few number of all half tone original documents, the aforementioned certain amount of empty capacity may be smaller than 8 M bits, for example 7 M bits. The memory controller 158 controls the accumulation status of the code memory 155 so that the data amount does not exceed the certain amount of empty capacity, and judges whether or not the memory becomes near full. Concretely, the detection of the memory near full is performed based on the data amount, assuming that the image data (the size is equal to the original document size) of the original document is compressed by the compressor 153 at the predetermined compression rate the same way as in the memory full detection shown in FIG. 9. In this embodiment, taking account of safety, the worst compression rate is employed as the predetermined compression rate. The worst compression rate for a photographic original document or an all half tone original document is 1.0. However, it is not limited to the worst compression rate but may be an average compression rate or a compression rate slightly lower than an average compression rate.

As shown in FIG. 12(A), in the code memory 155, the size of the total memory area for one job is shown as |*total memory area for one job*|. The reservation possible area within the total memory area is shown as |*reservation possible area*|. The aforementioned empty area of 8 M bits is shown as |*empty area*|.

When the memory area for storing the compressed image data is shown as |R1| assuming that the image data on page 1 of the original document is compressed at the compression rate 1.0, the CPU 122 compares the |*reservation possible area*| with the memory area |R1| required for storing the image data of page 1. If the |*reservation possible area*| is larger than |R1| (*reservation possible area*|>|R1|), as shown in FIG. 12(B), the image data of page 1 is compressed by the compressor 153 into the data P1. The data P1 is written in the code memory 155 as shown in FIG. 7.

Next, assuming that the image data on page 2 of the original document is compressed at the compression rate 1.0, it is judged whether or not it is possible to reserve R2 by comparing the compressed image data |R2| with the remained area of the |*reservation possible area*| of the code memory 155. If it is possible to reserve, as shown in FIG. 12(C), the image data R2 on page 2 is compressed into data P2. Then, the compressed data P2 is written into the code memory 155. The reserved image data is read out in turn to be printed.

Next, as shown in FIG. 12(C), assuming that the image data on page 3 of the original document is compressed at the compression rate 1.0, it is judged whether or not it is possible to reserve R3 by comparing the compressed image data |R3| with the remained area of the |*reservation possible area*| of the code memory 155. In this case, if it becomes impossible to reserve R3 in the |*reservation possible area*| because of the decreased empty capacity in the |*reservation possible area*|, or if a memory near full is occurred, it is possible to select release or non-release of the memory recall mode. If it is selected to continue the memory recall mode, the compressed image data P3 of page 3 is written in the code memory 155 by making use of the |*empty area*|. As shown in FIG. 12 (D), the compressed image data P3 on page 3 is forcibly discarded after the completion of printing thereof. Then, the compressed image data P4 of the image data R4 on page 4 is written in the |*empty area*| of the code memory 155. As for page 5, the compressed image data P4 on page 4 is discarded after the completion of printing thereof, and the compressed image data P5 on page 5 is written. Thus, while discarding the compressed image data P(n-1) on the previous page, the compressed image data Pn on the next page is written, read out and printed. Thus, prints of page 1 to page N can be obtained.

As it is apparent from the above, in the code memory 155, the compressed image data P1 and P2 on page 1 and page 2 are stored without being discarded. Therefore, in the case of printing a plural sets of original documents of N pages, from the next printing of the set of original documents, it is required only to read the original documents of a total (N−2) pages of page 3 to page N (i.e., the number of original documents to be returned is N−2). Since the re-reading of the original documents can be performed during the printing operation of the image data of pages 1 and 2 stored in the code memory 155 and it is not required to read the image data of page 1 and page 2, the whole processing time can be shortened. The number N−2of the original documents to be returned is displayed on the crystal display 206 of the operation panel 200 based on the instruction of the CPU 122 of the general controller 120.

In the above explanation, in cases where the continuation of the memory recall mode is released by the operation of the release key 208 when it becomes impossible to reserve the image data R3 on page 3, as shown in FIG. 12(E), the stored compressed image data P1 and P2 of pages 1 and 2 are forcibly discarded from the code memory 155 after printing them. In this state, the compressed image data of page subsequent to page 2 is written, printed and then discarded repeatedly in the same way as mentioned above, to obtain prints of pages 1 to N.

Figure 13:
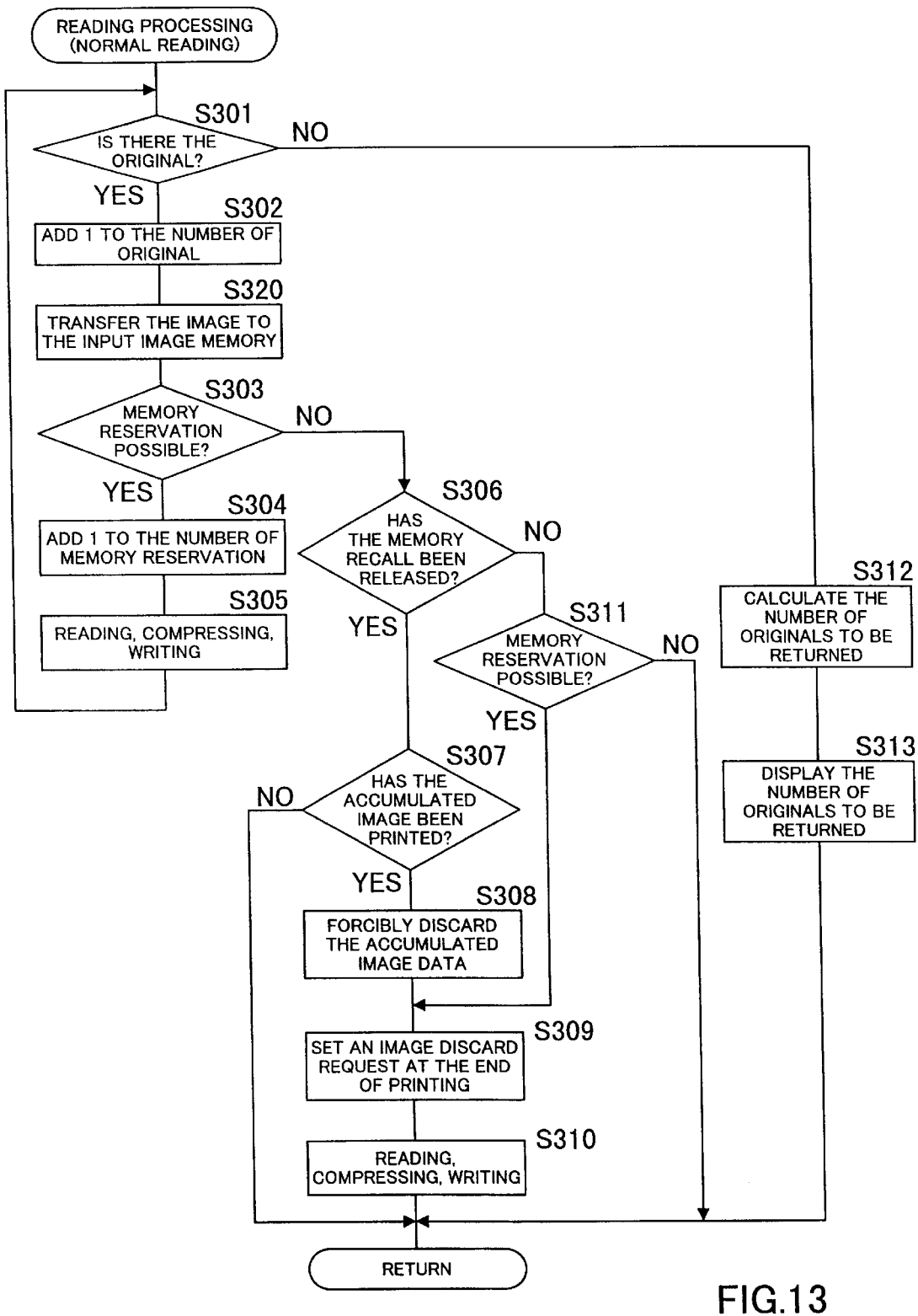
FIG. 13 is a flowchart showing a subroutine of the reading processing in the flowchart shown in FIG. 8 which shows the operation when the memory becomes nearly full.

FIG. 13 is a flowchart showing the operation when the memory becomes near full in the memory recall mode, and is a subroutine showing the contents of the reading processing S55 in the main routine shown in FIG. 8.

In S301, it is checked whether or not there is the original document (page n). If there is the original document (YES in S301), in order to calculate the number of pages of the original documents to be returned when the memory becomes near full, in S302, 1 is added to the number of original documents to grasp the total number n of original documents at this time.

In S320, the image data is transferred to the input image memory 151. Thereafter, in S303, it is judged whether or not it is possible to reserve (store) the image data Rn assuming that the image data is compressed at the compression rate is 1.0 in the |*reservation possible area*| of the code memory. If it is possible to reserve (YES in S303), in S304, 1 is added to the number of memory reservation. Thereafter, in S305, the image data Rn is read, compressed by the compressor 153 and written in the reservation possible area of the code memory 155. Then, the routine returns to S301 to check whether or not there is the next original document of page (n+1).

As a result of the judgement in S303, if it is impossible to reserve the data in the |*reservation possible area*| (memory near full), in S306, it is judged whether or not the memory recall mode has been released. If not released (YES in S306), in S307, it is judged whether or not the accumulated image data P1 to Pn−1 have been printed. If printed (YES in S307), in S308, these image data are forcibly discarded. Thereafter, this routine proceeds to S309.

As a result of the judgement in S306, if it is judged that the memory recall mode has been continued (NO in S306), in S311, it is judged whether or not it is possible to reserve the image data Rn. If it is possible to reserve by making use of the whole or a part of the |*empty area*| (YES in S311), the routine proceeds to S309. If impossible (NO in S311), the routine returns since the printing of the compressed image data of the page immediately before the page whose image is stored in the |*empty area*| is not terminated.

The releasing or non-releasing of the memory recall mode may be set before the job by a user, or may be set at the time when the memory becomes near full. Furthermore, when the memory recall mode is released, the fact that the memory recall mode is released may be displayed on the liquid crystal display 206 at the end of printing.

In S309, an image discard request for discarding the image data Pn which will be subjected to the following processing at the end of printing is set. After the setting of the discard request, in S310, the image data Rn is read, compressed by the compressor 153 and then written in the code memory 155. Then, the routine returns.

In S301, if there is no original documents (NO in S301), the routine proceeds to S312 to calculate the number of original documents to be returned from the difference between the number of original documents in S302 and the number of memory reservations in S304. The calculated number of original documents to be returned is displayed on the liquid crystal display 206 in S313. Then, the routine returns.

The processing for reading the original documents again by the image reader IR in order to print one or plural sets of original documents of pages 1 to N after the occurrence of the memory near full, is the same as in the processing shown in FIG. 11. Therefore, the explanation will be omitted.

In the above embodiments, the page 1 and page 2 of the original documents are memory reserved. However, only page 1 may be memory reserved. If the code memory 155 has enough capacity, the page 3 and the subsequent pages may also be memory reserved.

Furthermore, in the embodiments, the image data of each original documents is compressed and stored in the code memory 155. However, the image data may be stored without being compressed.

Furthermore, in the above embodiments, the original documents having page 1 to page N are printed in the page order. However, the original documents may be printed in a weekly magazine mode such that the combination of page 1 and page N, page 2 and page (N−1), page 3 and page (N−3) . . . page N/2 and page N/2−1 are subjected to a print processing.

Furthermore, in the aforementioned embodiment, as an example of the prescribed processing which enables a re-reading of the discarded image data by the image reading apparatus, a display processing for displaying the number of pages of the discarded image data is shown. As another example, the number of page from which image data was discarded may be stored and displayed on a liquid crystal display 206. In this processing, in place of the processing in S102 shown in FIG. 10 and S302 in FIG. 13, the page number of the original document is stored, in place of the processing in S104 shown in FIG. 10 and S304 in FIG. 13, the memory reserved page number of the original document is stored, in place of the processing in S114 shown in FIG. 10 and S312 in FIG. 13, the page number of the discarded image data is specified, and in place of the processing in S115 shown in FIG. 10 and S313 in FIG. 13, the page number of the discarded image data is displayed.

As another example of the prescribed processing which enables a re-reading of the discarded image data by the image reading apparatus, a re-transmission request of the discarded image data may be transmitted to a controller of the image reading apparatus to execute a processing of a re-reading of the discarded image data.

Although the processing shown in FIGS. 9 to 13 is executed in the memory recall mode, the processing can be executed in the electronic sort mode.

Furthermore, the present invention can be applied to another image processing system. For example, it can be applied to an image processing system including an image reading apparatus and a PC connected thereto and an image transferring system such as a facsimile. The same effects can be attained by applying the present invention when a memory becomes full or nearly full in a processing for transferring jobs of a plurality of pages to a plurality of addresses by a facsimile or in a processing for storing a plurality of jobs in a DRAM in a work area in a PC.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An image processing system, comprising:
   an image reader for reading image data of original documents;
   a memory which is capable of storing image data of the original documents of a plurality of pages read by said image reader;
   a first controller which executes a writing of a set of image data of the original documents of a plurality of pages into said memory in a prescribed page order, and repeatedly executes a reading of the set of image data from said memory and an image processing thereof;
   a detector for detecting insufficiency of empty capacity of said memory;

a second controller which, in the event that insufficiency of empty capacity of said memory is detected by said detector during the writing of image data into said memory by said first controller, holds the image data of the original documents of one or a plurality of pages stored in said memory and executes a subsequent image processing by using the image data held in said memory; and a third controller which executes a prescribed processing for a re-reading of image data of the original documents corresponding to the image data not held in said memory among the set of image data by said image reader in the subsequent image processing by said second controller.

2. The image processing system as recited in claim 1, wherein said detector detects insufficiency of empty capacity of said memory under the condition that an empty area of a predetermined capacity remains in said memory.

3. The image processing system as recited in claim 1, further comprising a compressor for compressing image data before storing the image data into said memory, wherein said detector detects the insufficiency of empty capacity of said memory based on a capacity of image data of one page compressed at a certain compression rate.

4. The image processing system as recited in claim 1, wherein said prescribed processing by said third controller is a display processing for displaying information on the original document to be read again.

5. The image processing system as recited in claim 4, wherein said display processing is a processing for displaying the number of the original documents to be read again.

6. The image processing system as recited in claim 4, wherein said display processing is a processing for displaying a page number of the original document to be read again.

7. The image processing system as recited in claim 1, wherein said prescribed processing by said third controller is a processing for requesting a re-reading of the original document corresponding to the image data not held in said memory.

8. The image processing system as recited in claim 1, further comprising release means for releasing a repetition of the reading of the set of image data from said memory and the image processing thereof by said first controller when said detector detects the insufficiency of empty capacity of said memory.

9. The image processing system as recited in claim 1, wherein, in case of a repetition of image processing of the set of image data, said second controller reads out the stored image data of one or a plurality of pages to execute an image processing thereof and executes a writing of image data not stored into said memory, a reading of the image data from said memory and an image processing thereof and a deletion thereof from said memory every page.

10. The image processing system as recited in claim 1, wherein said image processing is a print processing for forming an image on a sheet based on the image data.

11. An image processing method which repeatedly reads out a set of image data of a plurality of pages from a memory to execute an image processing thereof, the method including the steps of:

writing the set of image data of original documents of a plurality of pages read by an image reader into the memory in a prescribed page order in turn and reading out the image data written in the memory in turn to execute an image processing thereof;

detecting insufficiency of empty capacity of the memory during the writing of the image data into the memory;

holding only the image data of the original documents of one or a plurality of pages stored in the memory and executing a subsequent image processing by utilizing the image data held in the memory; and executing a prescribed processing for a re-reading of the original documents corresponding to the original documents whose image data is not held in the memory among the set of image data by the image reader in the subsequent image processing.

12. The image processing method as recited in claim 11, further including a step of compressing image data before storing the image data into the memory, wherein said step of detecting the insufficiency of empty capacity of the memory is performed based on a capacity of image data of one page compressed at a certain compression rate.

13. The image processing method as recited in claim 11, wherein said subsequent image processing executes a reading of the image data of the original documents of one or a plurality of pages stored in the memory to perform an image processing of the image data, and repeatedly executes a processing of a re-reading the original document of a page whose image data is not stored in the memory, a writing of the image of the image data in the memory, an image processing thereof and a deletion thereof after said image processing every page.

14. The image processing method as recited in claim 11, wherein said prescribed processing is a processing for displaying information on the original document to be read again.

15. An image processing system with a memory capable of storing image data of a plurality of pages which executes a writing of a set of image data of a plurality of pages into said memory in a prescribed page order, and repeatedly executes a reading of the set of image data from said memory and an image processing thereof, the image processing system, comprising:

an image reader for reading original documents of a plurality of pages to obtain a set of image data to be stored in said memory;

a detector for detecting insufficiency of empty capacity of said memory;

a first processor which, in the event that the insufficiency of empty capacity of said memory is detected by said detector during the writing of the set of image data into said memory, executes an image processing of the image data of one or a plurality of pages previously stored in said memory without deleting the image data from said memory, and executes an image processing of image data of one or a plurality of subsequent pages while executing a writing of the image data into said memory and a deletion thereof from said memory every page; and a second processor which executes an image processing of a second set of image data, wherein said second processor executes an image processing of the image data of one or a plurality of pages stored in said memory by reading out the image data and an image processing of the image data of a subsequent page obtained by reading the original document again; and a third processor for executing a prescribed processing for a re-reading by said second processor.

16. The image processing system as recited in claim 15, wherein said prescribed processing by said third processor is a display processing for displaying information on the original documents to be read again on a display.

17. An image processing system, comprising:

an image reader for reading image data of original documents;

a memory which is capable of storing image data of the original documents of a plurality of pages read by said image reader;

a detector for detecting insufficiency of empty capacity of said memory; and a controller for executing a writing of a set of image data of the original documents of a plurality of pages into said memory in a prescribed page order, and repeatedly executing a reading of the set of image data from said memory and an image processing thereof, wherein said controller, in the event that insufficiency of empty capacity of said memory is detected by said detector during the writing of image data into said memory by said controller, holds the image data of the original documents of one or a plurality of pages stored in said memory and executes a subsequent image processing by using the image data held in said memory, and wherein said controller executes a prescribed processing for a re-reading of image data of the original documents corresponding to the image data not held in said memory among the set of image data by said image reader in the subsequent image processing by said controller.

* * * * *